United States Patent [19]

Buhrlen

[11] 4,355,263
[45] Oct. 19, 1982

[54] IGNITION CIRCUIT FOR EXPLOSIVE DEVICES AND THE LIKE

[75] Inventor: Harold Buhrlen, Flintridge, Calif.

[73] Assignee: James E. Meagher, La Canada, Calif.

[21] Appl. No.: 263,916

[22] Filed: May 15, 1981

[51] Int. Cl.³ ............................................ H05B 37/02
[52] U.S. Cl. ............................. 315/209 T; 315/219; 315/DIG. 7; 307/247 R; 307/273
[58] Field of Search ............. 315/209 T, 219, DIG. 7; 307/247 R, 273

[56] References Cited

U.S. PATENT DOCUMENTS

| | | | |
|---|---|---|---|
| 3,581,725 | 6/1971 | Hemphill | 315/209 T |
| 3,731,144 | 5/1973 | McKeown | 315/209 T |
| 3,779,692 | 12/1973 | Ballantyne | 315/209 T |
| 4,153,032 | 5/1979 | Chateau | 315/209 T |

OTHER PUBLICATIONS

IC Timer/OSC JA-1555 pp. 45, 47, 48 Data Sheet supplied by applicant.

*Primary Examiner*—Harold A. Dixon

[57] ABSTRACT

An Ignition Circuit for Explosives with an Inverter circuit including a transistor controlled transformer circuit wherein a specific multivibrator circuit controls the transistor.

5 Claims, 2 Drawing Figures

IGNITION CIRCUIT FOR EXPLOSIVE DEVICES AND THE LIKE

BACKGROUND OF THE INVENTION

This invention relates to electrical circuits for firing explosives and, in particular, to a new and improved oscillator circuit for generating an electric spark between spaced electrodes for igniting a solid explosive, such as would be used in a firearm for propelling a projectile.

Battery-powered oscillator circuits have been utilized for producing electric arcs between electrodes for igniting a fluid fuel in a turbine engine, as shown in U.S. Pat. Nos. 3,671,805 and 3,731,144. Also, oscillator circuits have been utilized for energizing heating elements for setting off explosives, as shown in U.S. Pat. No. 4,141,297. However, it is an object of the present invention to provide a new and improved ignition circuit providing an electric spark between electrodes for igniting a solid explosive of the type used in firearms and the like.

The ignition circuit for a firearm should provide a hot, blue spark for igniting the solid explosive. Also, the ignition circuit should provide repeated firing capability with a minimum recovery time, so that the circuit can be used with automatic weapons. Another requirement is that the circuit have a minimum battery drain, so that the overall circuit including battery can be made quite small. These requirements are diverse in nature, and it is an object of the present invention to provide a new and improved ignition circuit having optimum performance characteristics.

It is a particular object of the invention to provide a new and improved ignition circuit which will produce the desired spark for the repeated firing of solid propellant explosives while operating with a small battery and having substantial operating life. A further object is to provide such a circuit which can be a solid state device without having any mechanical or moving parts other than the firing switch, and which can be made quite small, inexpensive, and reliable and of a configuration readily incorporated into a firearm.

A further object of the invention is to provide such an ignition circuit incorporating provisions for control of operating frequency and duty cycle along with current load so that the circuit can be modified for various end uses. Other objects, advantages, features, and results will more fully appear in the course of the following description.

SUMMARY OF THE INVENTION

The ignition circuit provides an electric spark between spaced electrodes for igniting an explosive. The circuit includes a step-up transformer having a primary winding and a secondary winding on a ferrite core, with the secondary winding adapted for directly connecting to the spaced electrodes. This circuit also includes a transistor with base and emitter and collector electrodes, a battery with positive and negative terminals, an on-off switch, and circuitry connecting the transistor electrodes, transformer primary winding and switch in series across the battery. The ignition circuit also includes an integrated circuit free running multi-vibrator with the on-off switch connecting one terminal of the battery to control voltage and reset inputs and with the other terminal of the battery connected to circuit ground of the multi-vibrator. A capacitor is connected between the other battery terminal and trigger and threshold input of the multi-vibrator, and resistors are connected in series between this capacitor and the switch, with the series junction of the resistors connected to the discharge input of the multi-vibrator. Another resistor is connected between the output of the multi-vibrator and the transistor base. With this configuration, a substantially square wave output is provided to the transistor base whenever the on-off switch is closed to turn the circuit on. Turning the transistor on provides a current pulse in the transformer primary and the step-up winding ratio provides a substantially higher voltage pulse at the transformer secondary and the spaced electrodes. The frequency of the multi-vibrator operation and the duty cycle may be varied by adding a capacitor across the series resistors and by having a capacitor in the circuit between the multi-vibrator output and the transistor base.

DESCRIPTION OF THE PREFERRED EMBODIMENTS

Figure 1:
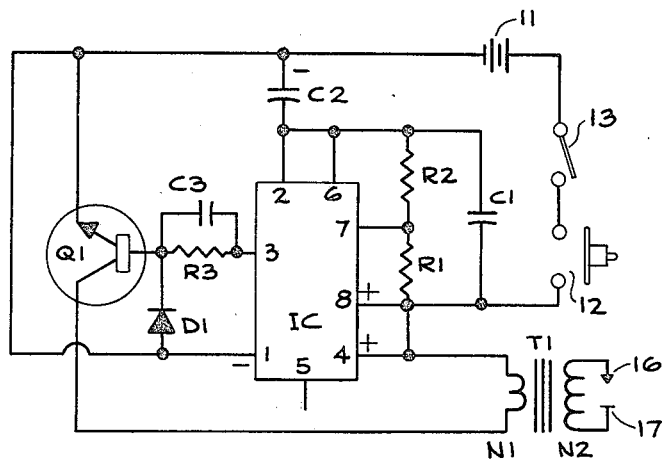
FIG. 1 is an electric circuit diagram of an ignition circuit incorporating the presently preferred embodiment of the invention.

The ignition circuit of FIG. 1 includes a battery 11, a transistor Q1, a transformer T1, a push-button switch 12, and a safety switch 13, with the transistor, transformer primary winding N1, and the two switches connected in series with the battery. The secondary winding N2 of the transformer is connected directly across spaced electrodes 16, 17.

Figure 2:
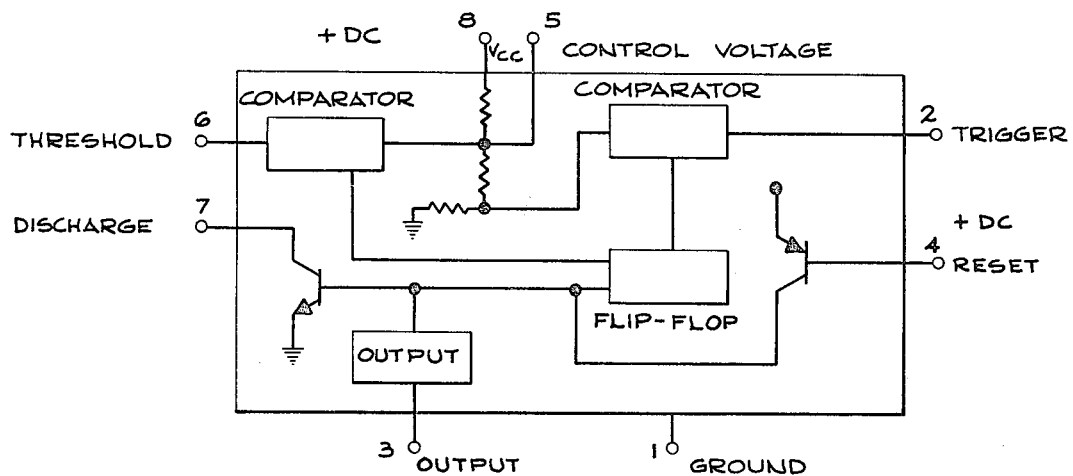
FIG. 2 is a diagram of the integrated circuit chip of FIG. 1.

The ignition circuit of FIG. 1 also includes an integrated circuit IC which is a free-running multi-vibrator having terminals 1–8. The multi-vibrator IC is shown in greater detail in FIG. 2 and typically may be a Texas Instruments NE 555 or a Motorola C6130P or a J4-1555 timer-oscillator chip.

The multi-vibrator terminals 4 and 8 are connected together and to the positive battery terminal through the switches 12, 13. The multi-vibrator terminal 1 serves as circuit ground and is connected to the negative terminal of the battery. The output terminal 3 of the multi-vibrator is connected to the base of the transistor Q1 through resistor R3. In the preferred embodiment, a capacitor C3 is connected across the resistor R3. A diode D1 is connected between the transistor base and circuit ground, to prevent high negative voltages on the transistor base.

Multi-vibrator terminals 2 and 6 are connected together and to the negative terminal of the battery through a capacitor C2. Resistors R1, R2 are connected in series between terminals 2 and 6 at one end and terminals 4 and 8 at the other end. The junction between the two resistors is connected to multi-vibrator terminal 7. Also in the preferred embodiment, capacitor C1 is connected across the resistors R1, R2.

In the preferred embodiment illustrated, the transformer has a 1 to 400 step-up ratio, and the battery is a 12 volt battery rated at 1.5 ampere hours. The values for the other components are set out in Table 1.

TABLE 1

| R1 8.2 kohms | C1 1 mf |
|---|---|
| R2 2.2 kohms | C2 .01 mf |

TABLE 1-continued

| R3 2.2 kohms | C3 5 mf |
|---|---|
| Q1 2N-3055 | T1 Time-Magn.1002 |
| D1 1N-3600 | |

In operation, the safety switch 13 is closed, and the ignition circuit is ready for use. When it is desired to ignite an explosive, the push button 12 is depressed, providing battery voltage across the emitter and collector of the transistor through the primary winding N1, and also providing battery voltage to the multi-vibrator at pins 1 and 8. This produces oscillation of the multi-vibrator and provides the substantially square wave output at terminal 3, cyclically switching the transistor into and out of conduction and providing a series of current pulses in the transformer primary. The voltage of these pulses is increased by the step-up ratio of the windings, providing a high voltage pulse train across the electrodes 16, 17.

The frequency of the multi-vibrator output is controlled by the selection of resistors R1 and R2 and capacitors C1 and C2, as follows:

$$f = \frac{1}{t} = \frac{1.44}{(R1 + 2R2) \times (C1 + C2)}$$

With capacitor C1 omitted, the frequency is about 10 khz. With C1 included at the value stated, the frequency is reduced to about 1 khz. This also reduces the current drain from the battery from about 2.5 amperes to about 250 milliamperes. With the capacitor C3 omitted, the duty cycle for the transistor Q1 is about 60% on and 40% off. With capacitor C3 added at the value indicated above, the duty cycle is about 80% on and 20% off.

This ignition circuit provides a number of advantages. The emitter of Q1 and transformer T1 may be connected directly across the battery. The ignition circuit does not require any storage capacitor in the secondary winding, and by providing for control of frequency and duty cycle, the desirable clean, blue spark can be achieved with a minimum of current drain. Such a spark is especially suited for igniting solid propellants of the type used in firearms.

I claim:

1. In an ignition circuit for an explosive or the like for producing an electric spark between spaced electrodes, the combination of:
    a step-up transformer having a primary winding and a secondary winding on a ferrite core;
    means for directly connecting said secondary winding to said spaced electrodes;
    a transistor having a base and emitter and collector electrodes;
    a battery having positive and negative terminals;
    an on-off switch;
    circuit means connecting said transistor electrodes, primary winding and switch in series with said battery;
    an integrated circuit free running multi-vibrator having a first control voltage and reset input, a second trigger and threshold input, a circuit ground, a third discharge input, and an output, with said switch connecting said first input to one terminal of said battery and with said circuit ground connected to the other terminal of said battery;
    a first capacitor connected between said other terminal of said battery and said second input;
    first and second resistors connected in series between said first and second inputs, with said first and second resistors interconnected at said third input; and
    a third resistor connected between said output and said transistor base.

2. An ignition circuit as defined in claim 1 including a second capacitor connected across said first and second resistors for reducing the frequency of said multi-vibrator.

3. An ignition circuit as defined in claim 2 including a third capacitor connected across said third resistor for changing the duty cycle of said multi-vibrator by increasing the on time.

4. An ignition circuit as defined in claim 3 including a diode connected between said transistor base and circuit ground.

5. An ignition circuit as defined in claim 1 including a second capacitor connected across said third resistor for changing the duty cycle of said multi-vibrator by increasing the on time.

* * * * *